US009819774B2

(12) United States Patent
Siegel

(10) Patent No.: US 9,819,774 B2
(45) Date of Patent: Nov. 14, 2017

(54) MOBILE AND LANDLINE CALL SWITCHING

(75) Inventor: Jeffrey Siegel, Los Gatos, CA (US)

(73) Assignee: Plantronics, Inc., Santa Cruz, CA (US)

( * ) Notice: Subject to any disclaimer, the term of this patent is extended or adjusted under 35 U.S.C. 154(b) by 1039 days.

(21) Appl. No.: 13/474,615

(22) Filed: May 17, 2012

(65) Prior Publication Data

US 2013/0310049 A1 Nov. 21, 2013

(51) Int. Cl.
*H04M 1/60* (2006.01)
*H04M 1/725* (2006.01)
*H04M 7/00* (2006.01)
*H04M 3/42* (2006.01)
*H04M 1/253* (2006.01)

(52) U.S. Cl.
CPC ....... *H04M 1/6066* (2013.01); *H04M 1/7253* (2013.01); *H04M 3/42263* (2013.01); *H04M 7/0057* (2013.01); *H04M 1/2535* (2013.01); *H04M 3/42059* (2013.01); *H04M 3/42195* (2013.01); *H04M 3/42357* (2013.01); *H04M 2203/2094* (2013.01); *H04M 2250/02* (2013.01)

(58) Field of Classification Search
CPC ..... H04W 4/16; H04W 92/02; H04M 1/6066; H04M 1/7253; H04M 7/0057; H04M 3/42263; H04M 1/2535; H04M 3/42059; H04M 3/42195; H04M 3/42357; H04M 2203/2094; H04M 2250/02
USPC .................................................. 455/435–445
See application file for complete search history.

(56) References Cited

U.S. PATENT DOCUMENTS

| | | | |
|---|---|---|---|
| 6,546,096 B1 | 4/2003 | Meiden et al. | |
| 2007/0047708 A1* | 3/2007 | Boillot | H04M 1/578 379/142.01 |
| 2008/0259829 A1 | 10/2008 | Rosenblatt | |
| 2009/0305632 A1 | 12/2009 | Sarkissian et al. | |
| 2010/0066677 A1 | 3/2010 | Garrett et al. | |
| 2010/0151845 A1* | 6/2010 | Rountree | 455/417 |
| 2011/0207447 A1 | 8/2011 | Bhow | |
| 2011/0258319 A1 | 10/2011 | Efthymiou et al. | |
| 2012/0005281 A1 | 1/2012 | Winter et al. | |
| 2012/0327812 A1* | 12/2012 | Xiao et al. | 370/259 |

FOREIGN PATENT DOCUMENTS

| | | |
|---|---|---|
| EP | 1672940 A1 | 6/2006 |
| WO | WO-2006/020168 A2 | 2/2006 |

OTHER PUBLICATIONS

User Application Initiated Telephony. U.S. Appl. No. 13/044,802, filed Mar. 10, 2011. Inventors: Frederick Sakissian, Jeffrey Sigel.
Communications Network Call Initiation Transition. U.S. Appl. No. 13/081,261, filed Apr. 6, 2011. Inventors: KennethKkannappan, Gunjan Bhow.

(Continued)

*Primary Examiner* — Marcos Torres

(57) ABSTRACT

Systems and methods for transitioning calls are presented. In one example, data is received associated with a connected wireless mobile phone call. The data may include identification data of a far end call participant. A user selection is received to initiate an outgoing call to the far end participant. The outgoing call is initiated over a wired connection to the far end participant.

19 Claims, 11 Drawing Sheets

(56) References Cited

OTHER PUBLICATIONS

Mobile Device Data Transfer. U.S. Appl. No. 13/474,651, filed May 17, 2012. Inventors: Jeffrey Siegel, William J. Leowenthal Jr.
International Search Report and Written Opinion for international application No. PCT/US2013/040991, filed May 14, 2013.
International Search Report and Written Opinion for international application No. PCT/US2013/041013, filed May 14, 2013.

* cited by examiner

500

600

MOBILE AND LANDLINE CALL SWITCHING

BACKGROUND OF THE INVENTION

Most individuals have several telephony devices (also referred to herein as "telephones" or "telecommunications devices") available to them to make and receive calls. Mobile telephones, such as cellular telephones, have become ubiquitous as users enjoy the convenience and portability they provide. However, mobiles phones typically offer lower audio quality and unreliable connections.

In the home or office environment, users still typically maintain their traditional home desktop landline or office landline telephone using the traditional public switched telephone network (PSTN). More recently, users have started to utilize Voice over Internet Protocol (VoIP) telephones. The VoIP telephone may be a personal computer (PC) executing a VoIP application such as Skype that provides telephone communications service over the Internet.

VoIP telephones are popular with users as they provide telephony services for free or at reduced costs, including calls to international destinations. Furthermore, when implemented on a PC in the office, they typically are plugged into an A/C power source, thereby providing unlimited talk time. Office PCs are also typically connected to an IP network using a wired landline connection. VoIP telephones typically offer high call quality than mobile calls operating on cellular networks.

In the prior art, once a call is begun on a mobile telephone, a user typically remains on the mobile phone even if a higher quality landline connection such as VoIP or the PSTN is available. For example, a calling party may dial the user's mobile phone in order to increase the likelihood of reaching the user. If the user is in his home or office when the call is received, he or she will answer the mobile call and continue the call on the mobile phone out of convenience, thereby sacrificing call quality.

Alternatively, if the user does wish to utilize a landline connection, the user must perform a cumbersome process to transition the call to a landline connection. The user must terminate the call on the mobile telephone and then either dial the other call participant using the VoIP or PSTN phone, or have the other call participant dial the user on his VoIP or PSTN phone. As a result, either the user or the other call participant must manually locate or dial the others landline phone number. Furthermore, there is a lengthy interruption in the conversation between the user and the call participant.

As a result, there is a need for improved methods and systems for enabling transitioning of calls between telephony devices.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Figure 1:
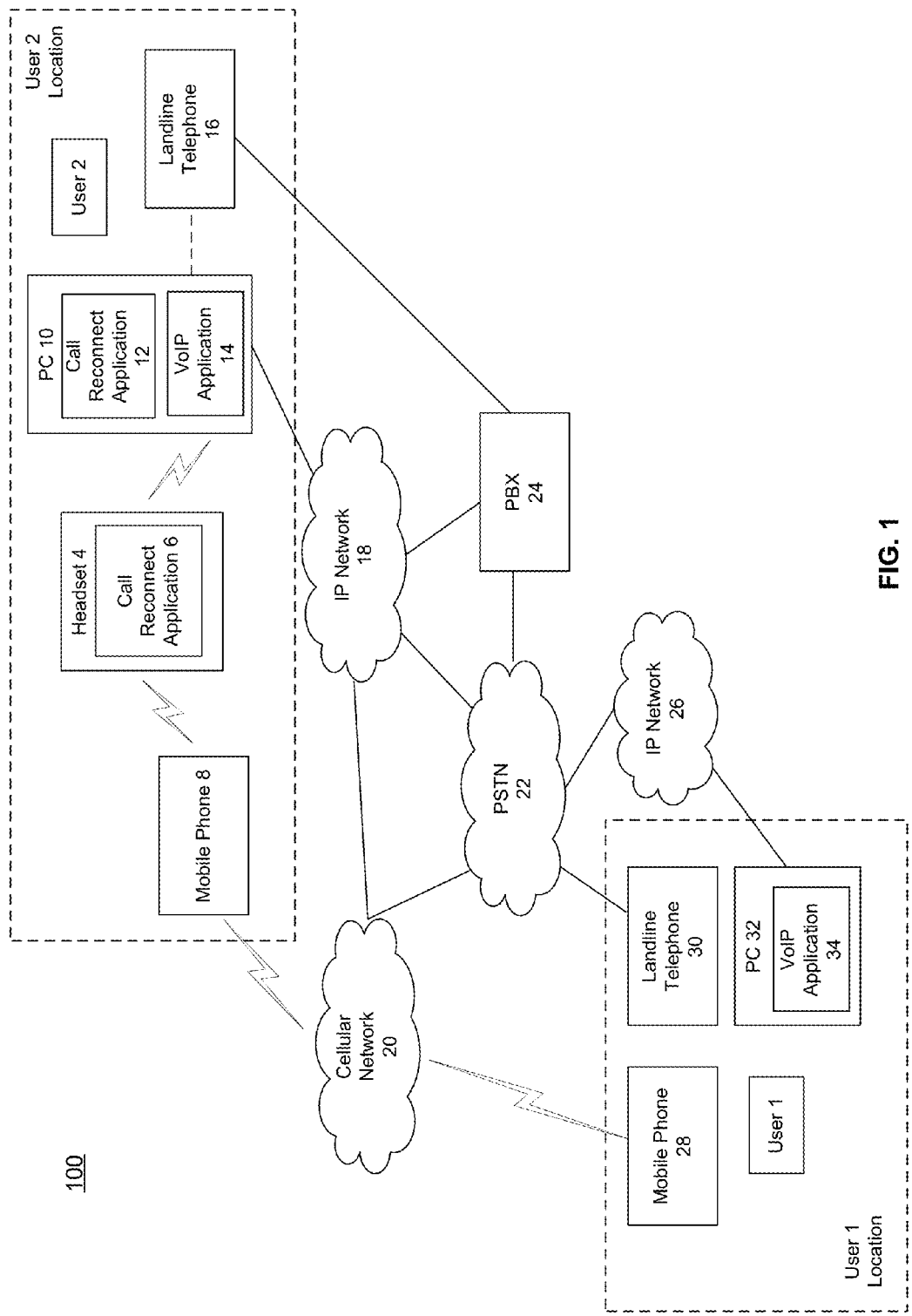
FIG. 1 illustrates a system for transitioning a call in one example.

Methods and apparatuses for transitioning calls between telephony devices are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

In one example, methods and apparatuses are described addressing the problems of poor audio quality and unreliable connections common in mobile telephony. It has become increasingly common for people to dial out using their mobile phone to leverage their mobile phone-contacts database for maximum convenience. It is also increasingly common to dial the receiving party's mobile phone to increase the likelihood of reaching the receiving party. While this optimizes call setup, once the two parties are communicating, the trade-off of poor and unreliable call quality becomes frequently apparent. To create a 'best of both worlds' scenario, the described systems and methods retain the convenience of the mobile phone call setup and then optimizes call quality or features by re-instating the connection with more a more reliable, higher fidelity, and richer communications experience possible through a PC voice application.

In one example, a computer readable storage memory stores instructions that when executed by a computer cause the computer to perform a method for call initiation. The method includes receiving a data associated with an active wireless mobile phone call, the data including caller identification data corresponding to a calling party, receiving a user selection to initiate an outgoing call to the calling party, and initiating the outgoing call over a wired connection.

In one example, a computing device includes a wireless transceiver configured for wireless communications with a mobile device, a wired network interface for a wired connection to a communications network, and a user interface.

The computing device further includes a memory storing a call reconnect application configured to receive a data over the wireless transceiver associated with an active wireless mobile phone call, the data including caller identification data corresponding to a calling party. The call reconnect application is further configured to initiate a reconnect call to the calling party over the wired network interface.

In one example, a computer readable storage memory stores instructions that when executed by a computer cause the computer to perform a method for call initiation. The method includes receiving a data associated with a connected wireless mobile phone call, the data including identification data between a local mobile phone user and a far end user, receiving a user selection to initiate an outgoing call to the far end user, and initiating the outgoing call over a wired connection to the far end user.

In one example, a computer readable storage memory stores instructions that when executed by a computer cause the computer to perform a method for call initiation. The method includes receiving a data associated with an active wireless mobile phone call, the data including caller presence information corresponding to a calling party. The data is processed to determine whether to present an option to a user to replace the active wireless mobile phone call with a replacement call.

In one example, contextual data about both call participants and their telephony devices is utilized to determine when and how to reconnect the call participants once a user selects an option to replace the mobile call with a PC based call through an application either residing on the PC or on a server that is accessed through the browser on the PC or other computing device. The contextual data may include participant identity data, dial number data, and participant presence data. Presence data may include, for example, any data that may be utilized to determine the availability of a participant to receive a communication on a particular device. For example, the participant contextual data may include 1) headset worn or not worn state (i.e., donned or doffed), 2) presence data such as participant proximity to their PC or tablet PC, 3) mobile telephony presence to detect an inbound call, and 4) identity of the call participants, including mobile caller identification (name and dial number) to identify who the calling party is and what devices they can be reached back on.

The contextual data is passed to the PC from a headset and/or directly from the mobile phone to the PC (of the calling or called party). It is used by a PC native or browser based voice application to determine when to display an option on the PC (or mobile device) screen that invites the user to re-initiate the call from the PC application and replace the mobile phone call. This option to re-initiate the call using the higher fidelity and more reliable PC connection (e.g., in comparison to a cellular phone network) will reduce the mobile voice minutes used and produce a more lifelike meeting experience and allow for creating a richer meeting experience using screen sharing or even video.

In one example, the PC application provides a means for the called party to use either the headset controls or a user input device on the PC to select the option to terminate the mobile call and initiate the call back to the calling party through a single action. The end result is having a higher fidelity call through the PC than is possible through the mobile phone without the downsides of latency and dropped calls that plague mobile phone calls.

In one example, all of the user contextual states from both parties is captured and provided to the PC application. The application then makes a determination of when it is possible to re-initiate the call and how to best do so. For example, it makes that determination by knowing who the calling party is and whether that person is also near their PC and has the appropriate PC telephony or conferencing application. Even if the calling party does not have that application or is not near their PC, the application on the called party side can re-initiate the call out to the deskphone or mobile phone of the calling party which can still improve the call quality and reliability substantially over two mobile phones being used on both ends of the call.

Advantages offered include reduced mobile telephony costs, improved call quality and reliability, and the option to turn the mobile call into a richer meeting experience using the rich web conferencing or video conferencing capabilities of a PC application. The systems and method retain the simplicity and ease of initiating and reaching people through their mobile phones while providing the higher fidelity and richer meeting experiences that are possible through the PC. The proximity of the participants to a PC is determined with little effort on the part of either user. The PC application offers the option to re-initiate the call under the right circumstances. All the user has to do on either end is use the headset to both terminate the mobile setup call and initiate the new higher fidelity PC call. Alternatively, it can be done through a user input device on the PC, whichever is considered more convenient by the user.

FIG. 1 illustrates a system 100 for transitioning a call using a headset in one example. Illustrated in FIG. 1 is a user 1 at a user 1 location and a user 2 at a user 2 location. At the user 2 location, the system includes a headset 4 operating in multipoint mode paired with both a mobile phone 8 and a telecommunications device such as a personal computer (PC) 10 executing a VoIP application 14 (also referred to herein as a "VoIP telephone" or a "softphone") and a call reconnect application 12. Personal computer 10 may, for example, be a notebook computer, a desktop computer, or a tablet computer. A call reconnect application 6 resides on headset 4 which operates in conjunction with call reconnect application 12 to provide for reconnection of a call being conducted using mobile phone 8 to VoIP application 14 on PC 10 or vice-versa. In operation, headset 4 may be in communication range or out of communication range with PC 10 depending upon movement of user 2. A landline telephone 16 is connected PSTN 22 via a PBX 24. In one example, landline telephone 16 is controllable by PC 10 to initiate calls over PSTN 22.

At the user 1 location, the system includes a mobile phone 28 in wireless communication with cellular network 10, a landline telephone 30 coupled to PSTN 22, and a PC 32 coupled to IP network 26. PC 32 executes a VoIP application 34. Mobile phone 8 at user 2 location is in wireless communication with cellular network 20, and can receive incoming calls via the cellular network 20 from a user 1 utilizing mobile phone 28, landline telephone 30, or VoIP application 34.

In one example, personal computer 10 includes a wireless transceiver configured for wireless communications with a mobile device, a wired network interface for a wired connection to a communications network, and a user interface. In one example, the mobile device is mobile phone 8 or wireless headset 4. In one example, the wireless transceiver is a Bluetooth communications transceiver. In one example, the wired network interface connects to Internet Protocol network 18 or public switched telephone network 22. In a further example, PC 10 includes a second wireless transceiver to connect to Internet Protocol network 18 via a wireless Access Point (AP). For example, the second wireless transceiver and AP may utilize an IEEE 802.11 communications protocol.

The personal computer 10 further includes a memory storing a call reconnect application 12 configured to receive a data over the wireless transceiver associated with an active wireless mobile phone call, the data including the fact that there is an active wireless mobile phone call and caller identification data corresponding to a calling party. The data may include data associated with both the calling party and the called party. The call reconnect application 12 is further configured to initiate a reconnect call to the calling party over the wired network interface. In a further application, the call reconnect application 12 is configured to initiate a reconnect call to the original dialed party of the active wireless mobile phone call. In a further example, the call reconnect application 12 is further configured to initiate the reconnect call to the calling party via the second wireless transceiver and wireless Access Point coupled to the Internet Protocol network 18 via a wired connection.

For illustrative purposes, in one usage scenario user 1 is the calling party and user 2 is the called party. As described below, in further examples, user 2 may be the calling party and user 1 may be the called party. In this example, the active wireless mobile phone call is between user 2 and user 1 over a cellular communications network 20 and the reconnect call made from PC 10 to user 1 is a VoIP call or a PSTN call. For example, the active wireless mobile phone call is between a user 1 mobile phone 28 and a user 2 mobile phone 8, and the reconnect call is made by PC 10 to a user 1 telephony device operating on a wired connection, such as landline telephone 30 or PC 32.

In one example, the call reconnect application 12 further receives a calling party presence data associated with user 1 or a user 2 presence data associated with the user 2. The presence data may be received over a wireless network interface or a wired network interface from a presence server as discussed in further detail below.

For example, the call reconnect application 12 processes the user 1 presence data or the user 2 presence data to determine whether to present to the user 2 an option to initiate the reconnect call to user 1. For example, the call reconnect application 12 processes the user 1 presence data to determine where the reconnect call is made to.

In one example, the reconnect call is initiated responsive to a user 2 selection received at the user interface of PC, 10, mobile phone 8, or headset 4. The user selection is received responsive to a displayed or otherwise presented option to reconnect the active wireless mobile phone call.

In a further example, call reconnect application 12 receives data associated with a connected wireless mobile phone call, the data including identification data of a local mobile phone user (e.g., user 2) and a far end user (e.g., user 1), receives a user 2 selection to initiate an outgoing call to the far end user 1, and initiates the outgoing call over a wired connection to the far end user 1. In this example, either user 1 or user 2 may have initiated the initial connected wireless mobile phone call.

In a further example, call reconnect application 12 receives data associated with an active wireless mobile phone call, the data including caller presence information corresponding to a calling party user 1. The data is processed to determine whether to present an option to replace the active wireless mobile phone call with a replacement call. In one example, the data is processed to determine whether the calling party user 1 is in proximity to a telephony device operable over a wired connection, such as landline telephone 30 or PC 32.

In a further example, call reconnect application 12 is configured to receive data associated with an active wireless mobile phone call, the data including caller identification data corresponding to a calling party. For illustrative purposes, in this usage scenario example, user 1 is the calling party and user 2 is the called party for the active wireless mobile phone call. In one example, the active wireless mobile phone call is between user 1 and user 2 over cellular communications network 20.

In one example, call reconnect application 12 is further configured to detect a mobile device in communication range of PC 10, the mobile device in use with the active wireless mobile phone call. For example, the mobile device is wireless headset 4 or mobile phone 8. In one example, detecting the mobile device in communication range includes detecting a transition from an out-of-range status to an in-range status as described in reference to FIG. 7 below.

In one example, the data received includes a user 1 presence data associated with user 1 or a user 2 presence data associated with the user 2. For example, the user 1 presence data includes user 1 location information. The user 1 location information may include a calling party proximity to a telephony capable device operating on a wired connection. The user 1 location information may be processed to determine when to present to the user an option to initiate an outgoing call to the calling party. The user 2 presence data includes user 2 location information including user 2 proximity to a telephony device operable to initiate the outgoing call over the wired connection. In one example, the data associated with an active wireless mobile phone call further includes a user 1 and user 2 identity.

The call reconnect application 12 is further configured to receive a user selection to initiate an outgoing call to the calling party. In one example, the user 2 selection to initiate the outgoing call to user 1 is received at user 1 mobile phone 8, a telephony capable device 16 operable to initiate the outgoing call over the wired connection, or headset 4. In one example, the user 2 selection to initiate an outgoing call to the user 1 is a single action responsive to a displayed option to reconnect the active wireless mobile call.

Call reconnect application 12 then initiates the outgoing call over a wired connection from user 2 to user 1. In one example, the outgoing call is a VoIP call or a PSTN call. In one example, the wired connection is between computer 10 and IP network 18. In one example, the outgoing call is a video conferencing call or a web conferencing call. The call reconnect application 12 further initiates termination of the active wireless mobile phone call.

In one example, the active wireless mobile phone call is between a user 1 mobile phone 28 and a user 2 mobile phone 8 and the outgoing call is made to a user 1 telephony device operating on a wired connection. Additional examples are described below in reference to FIG. 5 and FIG. 6.

Figure 2:
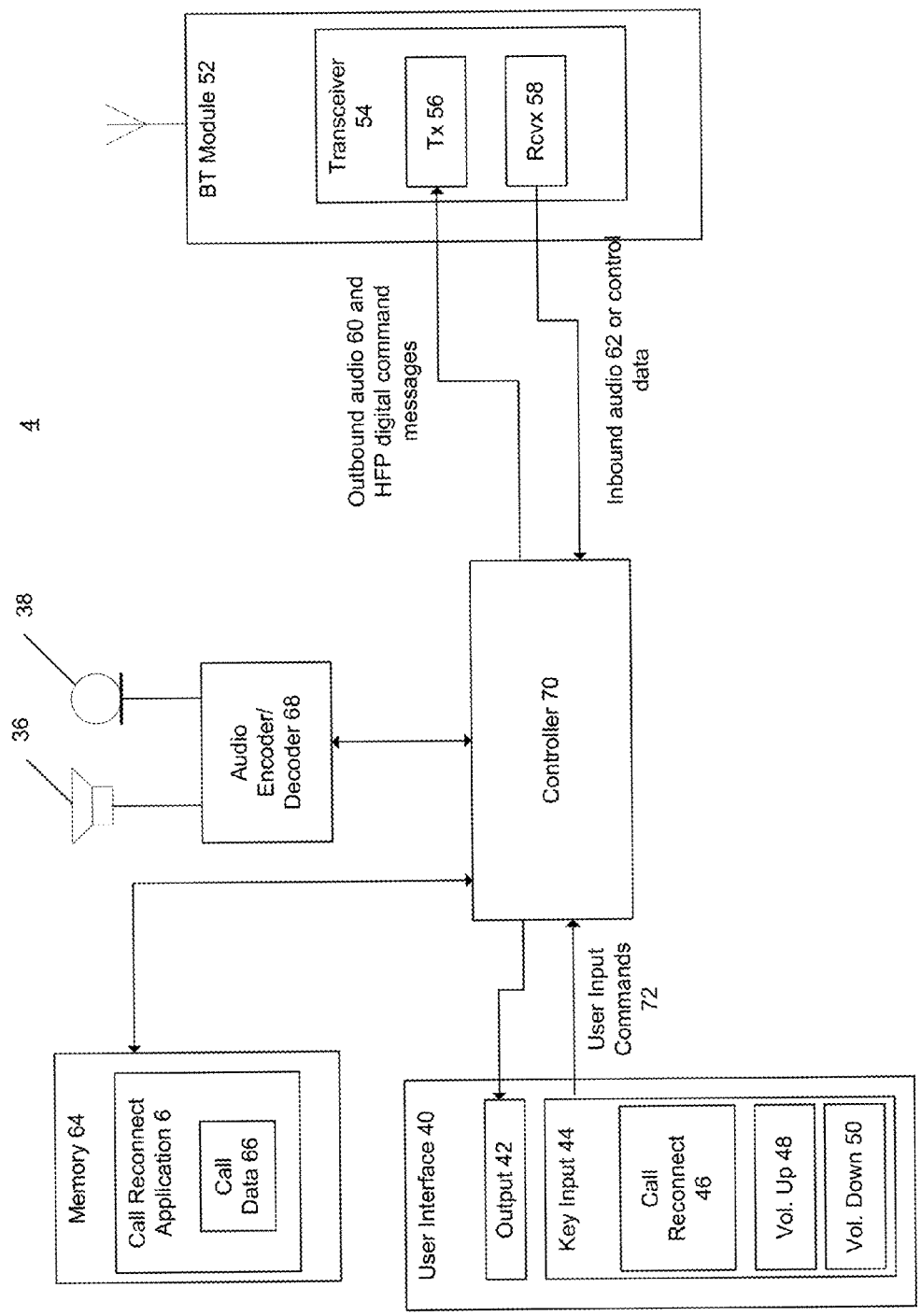
FIG. 2 illustrates a simplified block diagram of the headset shown in FIG. 1.

FIG. 2 illustrates a simplified block diagram of the headset shown in FIG. 1 where the headset 4 utilizes the Bluetooth protocol. In further examples, other wireless protocols may be utilized, such as IEEE 802.11 or digital enhanced cordless telecommunications (DECT). For clarity, not all components of the headset 4 are illustrated. The headset 4 includes a Bluetooth module 52, an audio encoder/decoder 68, memory 64, controller 70, user interface 40, speaker 36, and microphone 38. Controller 70 may include a variety of processors, such as digital signal processors.

User interface 40 includes a key input 44. Key input 44 includes a selectively enabled call reconnect function 46, volume up input 48 and volume down input 50. Key input 44 also includes a hookswitch function. The user interface 40 may also include one or more output interfaces 42 typical to headsets, such as LED indicators or some form of a display. The speaker 36 may also be used as an interface output.

In one example, call reconnect function 46 is a user input button activated during a headset call transition mode used to transfer a call with a call participant (e.g., user 1) from mobile phone 8 to VoIP application 14. For example, the call reconnect function 46 is operable to message PC 10 to initiate an outgoing call to user 1. During normal operation, this same user input button may function as a typical call answer and call terminate input interface.

Bluetooth module 52 includes a transceiver 54 having a transmitter 56 and a receiver 58. In the present example, Bluetooth module 52 receives and transmits a wireless signal utilizing the Bluetooth protocol Hands-Free Profile. The wireless signal transmitted by transmitter 56 includes outbound audio 60 and Hands-Free Profile command messages received from controller 70. Inbound audio 62 and control data is received by receiver 58 and sent to controller 70. Audio encoder/decoder 68 is used for processing a digital audio signal and an analog audio signal as known in the art.

The Bluetooth transceiver 54 is operable to simultaneously form Bluetooth ACL and SCO links with PC 10 and mobile phone 8. Controller 70 is operable to receive user input commands 72 from user interface 40 and convert these commands to Hands-Free Profile digital command messages. In one example, controller 70 is part of a Bluetooth chip set. These Hands-Free Profile digital command messages are sent to Bluetooth module 52 for wireless transmission using Bluetooth module 52. Controller 70 also receives inbound audio or audio files for output by speaker 36 following decoding by audio encoder/decoder 68. User interface 40, and in particular call reconnect function 46, can be any combinations of visual interfaces, tactile interfaces, and/or an audio interface that allow the user to input commands.

Memory 64 stores a call reconnect application 6 executed by controller 70 to perform call transition functions in conjunction with call reconnect application 12 on PC 10 as described herein. Such call transition functions may be executed by the headset user with the call reconnect function 46 key input. In one example, the call reconnect application 6 transmits to call reconnect application 12 call data 66 associated with an active wireless mobile phone call between mobile phone 8 and a user 1 telephony device. For example, call data 66 may include caller identification data for a user 1 telephony device mobile phone 28, landline telephone 30, or VoIP application 34.

Figure 3:
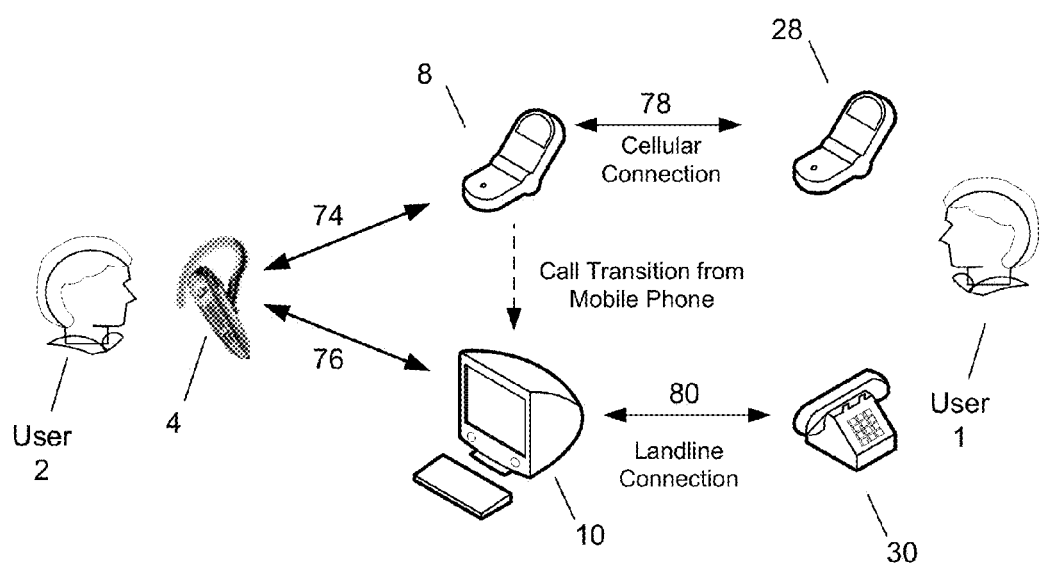
FIG. 3 illustrates the system shown in FIG. 1 in one example usage scenario.

FIG. 3 illustrates the system shown in FIG. 1 in one example usage scenario. In the scenario shown in FIG. 3, a cellular mobile call between a user 2 using mobile phone 8 and a user 1 using mobile phone 28 is active (i.e., currently connected) over a cellular connection 78. The user 2 using headset 4 is also able to form a local wireless link 74 with a mobile phone 8 to conduct the call with headset 4.

In this scenario, user 2 moves within range of PC 10 so that the user 2 using headset 4 is able to form a local wireless link 76 with PC 10. Once within range of PC 10, the user 2 may select to reconnect the call using PC 10 over a landline connection 80. In one example, the PC 10 dials the user 1 at a landline phone 30. In a further example, the PC 10 dials the user 1 mobile phone 28. In one example, PC 10 is used to implement VoIP communication over landline connection 80. Once the call is reconnected on landline connection 80 (i.e., transitioned from cellular connection 78 to landline connection 80), the user 2 can continue the call with user 1 using the higher quality landline connection 80. Landline phone 30 may be a desktop-based phone connected to the PBX via an IP-network or another IP-based dedicated calling device or may be connected to the PSTN.

In one example, where the headset 4 is a Bluetooth headset, the headset 4 communicates with a USB Bluetooth module (also referred to as a dongle) via the local wireless link 76, where the USB Bluetooth module includes a USB interface which may be inserted into a USB interface of the PC 10. The USB Bluetooth module at the PC 10 includes a Bluetooth audio gateway which is the gateway for both input audio and output audio. The Bluetooth headset 4 acts as a remote audio input and output mechanism for the Bluetooth audio gateway. Audio signals provided by the VoIP application 14 shown in FIG. 1 are sent to the USB Bluetooth module and then wirelessly sent to headset 4. Audio signals from the headset 4 are sent via the USB Bluetooth module to the VoIP application 14. The VoIP application 14 operates to handle bi-directional IP based telephony between the PC 10 and the IP network. Although a PC 10 is illustrated in FIG. 3, one of ordinary skill in the art will recognize that a variety of computing devices may be used to implement VoIP communications.

Figure 4:
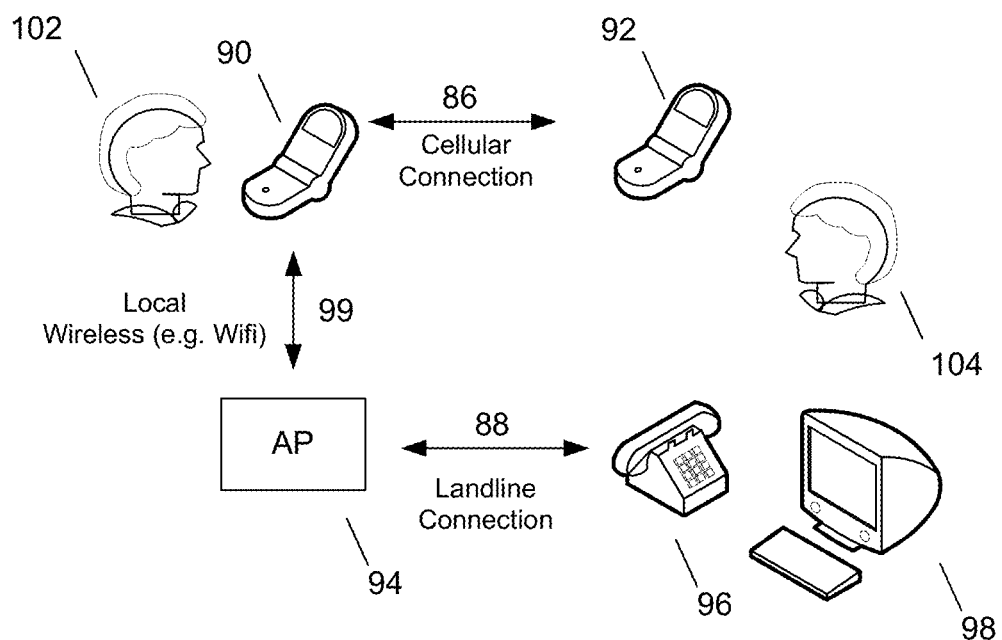
FIG. 4 illustrates a usage scenario in a further example.

FIG. 4 illustrates a usage scenario in a further example of a system. In the scenario shown in FIG. 4, a cellular mobile call between a user 102 using mobile phone 90 and a user 104 using mobile phone 92 is active (i.e., currently connected) over a cellular connection 86. Mobile phone 90 includes both a cellular communications transceiver and a local wireless transceiver such as transceiver configured for IEEE 802.11 communications. Mobile phone 90 includes a VoIP application and a call reconnect application operable to perform functions described herein.

In this scenario, user 2 moves within range of a wireless network Access Point (AP) 94 so that the user 2 using mobile phone 90 is able to form a local wireless link 99 with AP 94. For example, AP 94 may be an IEEE 802.11 Access Point connected to an IP network.

Once within range of AP 94, the user 2 may select to reconnect the call over landline connection 88. In this scenario, mobile phone 90 is utilized for both communications over cellular connection 86 and landline connection 88. In one example, the VoIP application at mobile phone 90 dials the user 1 at a landline phone 96. In a further example, the VoIP application at mobile phone 90 dials the user 1 at a PC 98 executing a VoIP application. In yet another example, the VoIP application at mobile phone 90 dials the user 1 at mobile phone 92. Once the call is reconnected on landline connection 80 (i.e., transitioned from cellular connection 78 to landline connection 80), the user 2 can continue the call with user 1 using the higher quality landline connection 80 instead of the mobile phone 90 cellular transceiver.

Figure 5:
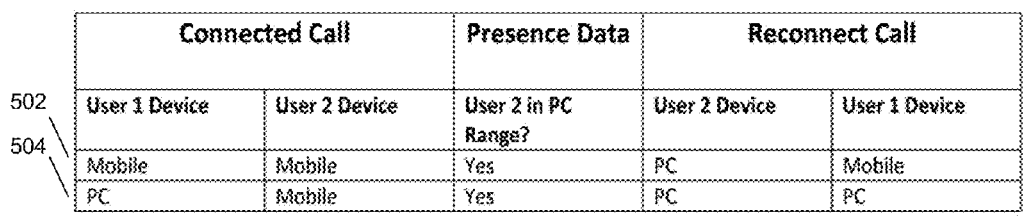
FIG. 5 is a table illustrating an example reconnect call configuration utilizing presence data of one call participant.

FIG. 5 is a table 500 illustrating example reconnect call configurations utilizing presence data of one call participant. In table 500, presence data associated with user 2 is utilized. In particular, whether user 2 is within a range of PC 10 is utilized to determine whether a reconnect call is initiated. For example, the determination of whether user 2 is within range of PC 10 is based on the proximity of headset 4 to PC 10.

In scenario 502, user 1 and user 2 are on a connected call, whereby user 1 is utilizing a mobile phone 28 and user 2 is utilizing a mobile phone 8. If user 2 is in range of PC 10, a reconnect call is initiated utilizing PC 10. PC 10 receives data associated with the connected call in order to initiate to reconnect call. For example, PC 10 receives caller ID information associated with user 1 and utilizes this caller ID information to dial the user 1 mobile phone 28. In this manner, the call is transitioned from the user 1 mobile phone 28 and the user 2 mobile phone 8 to the user 2 PC 10 and user 1 mobile phone 28.

In scenario 504, user 1 and user 2 are on a connected call, whereby user 1 is utilizing a PC 32 and user 2 is utilizing a mobile phone 8. If user 2 is in range of PC 10, a reconnect call is initiated utilizing the user 2 PC 10. PC 10 receives data associated with the connected call in order to initiate to reconnect call. For example, PC 10 receives caller ID information associated with user 1 and utilizes this caller ID information to dial the user 1 PC 32. In this manner, the call is transitioned from the user 1 PC 32 and the user 2 mobile phone 8 to the user 2 PC 10 and user 1 PC 32.

Figure 6:
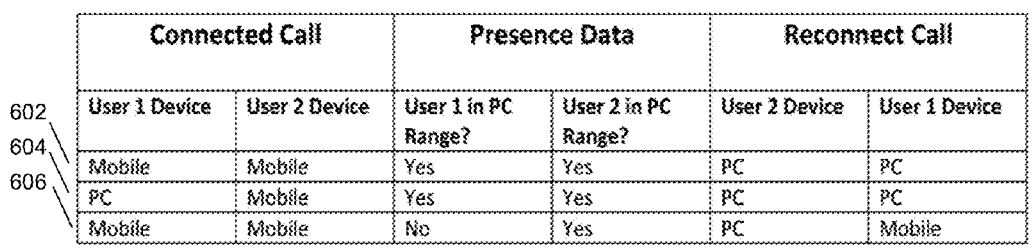
FIG. 6 is a table illustrating a further example reconnect call configuration utilizing presence data of both call participants.

FIG. 6 is a table 600 illustrating further examples of reconnect call configurations utilizing presence data of both call participants. In table 600, presence data associated with both user 1 and user 2 is utilized. In particular, whether user 2 is within a range of PC 10 and whether user 1 is within range of PC 32 is utilized to determine whether and where a reconnect call is initiated. For example, the determination of whether user 2 is within range of PC 10 is based on the proximity of headset 4 to PC 10 and the determination of whether user 1 is within range of PC 32 is based on the proximity of mobile phone 28 to PC 32.

In scenario 602, user 1 and user 2 are on a connected call, whereby user 1 is utilizing a mobile phone 28 and user 2 is utilizing a mobile phone 8. If user 2 is in range of PC 10, a reconnect call is initiated utilizing PC 10. If user 1 is in range of PC 32, the reconnect call is made to PC 32.

PC 10 receives data associated with the connected call in order to initiate the reconnect call. For example, PC 10 receives caller ID information associated with user 1 and utilizes this caller ID information to dial PC 32. For example, the caller ID information is the name and mobile number of user 1. PC 10 may utilize a contacts database to lookup the user 1 name to identify the user 1 dial number of PC 32. In this manner, the call is transitioned from the user 1 mobile phone 28 and the user 2 mobile phone 8 to the user 2 PC 10 and user 2 PC 32.

In scenario 604, user 1 and user 2 are on a connected call, whereby user 1 is utilizing a PC 32 and user 2 is utilizing a mobile phone 8. If user 2 is in range of PC 10, a reconnect call is initiated utilizing the user 2 PC 10. PC 10 receives data associated with the connected call in order to initiate to reconnect call. Since user 1 is utilizing a landline connection already with PC 32, PC 10 receives caller ID information associated with user 1 (e.g., the PC 32 dial number) and utilizes this caller ID information to dial the user 1 PC 32. In this manner, the call is transitioned from the user 1 PC 32 and the user 2 mobile phone 8 to the user 2 PC 10 and user 1 PC 32.

In scenario 606, user 1 and user 2 are on a connected call, whereby user 1 is utilizing a mobile phone 28 and user 2 is utilizing a mobile phone 8. If user 2 is in range of PC 10, a reconnect call is initiated utilizing the user 2 PC 10. PC 10 receives data associated with the connected call in order to initiate to reconnect call, such as the caller identification data of the caller 1 mobile phone 28 (e.g., dial number). Since user 1 is not within range of PC 32, the reconnect call is made to the user 1 mobile phone dial number. In this manner, the call is transitioned from the user 1 mobile phone 28 and the user 2 mobile phone 8 to the user 2 PC 10 and user 1 mobile phone 28.

Figure 7:
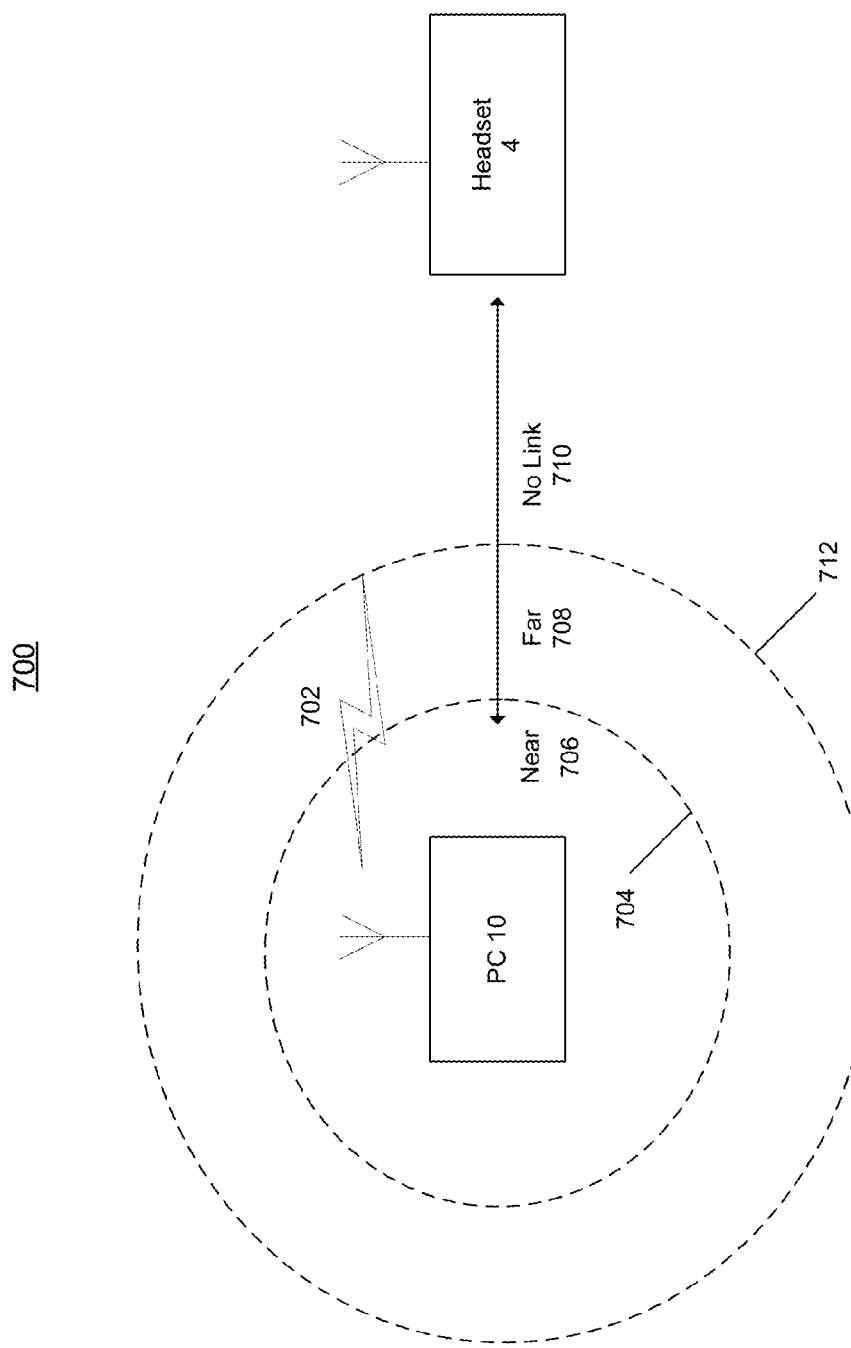
FIG. 7 illustrates an example usage scenario for a call transitioning system where a wireless communication device transitions between a near state, far state, or no-link state with respect to a base computing device.

FIG. 7 illustrates an example usage scenario for a call transitioning system where a wireless communication device (e.g., a headset 4) transitions between a near state, far state, or no-link state with respect to a base computing device (e.g., PC 10). In a further example, the wireless communications device is a mobile phone. A system 700 includes a PC 10 and headset 4 capable of wireless communication there between as previously described. The received signal strength indicator (RSSI) of the wireless link 702 is measured and monitored to determine the proximity of the headset 4 from the PC 10.

In system 700, a proximity boundary 704 establishes a range from PC 10 below which headset 4 is considered to be in a NEAR state 706 and beyond which headset 4 is considered to be in a FAR state 708.

A link availability boundary 712 establishes a range from PC 10 beyond which headset 4 can no longer maintain wireless link 702. In one example, headset 4 is a Bluetooth headset operating in class 2 mode. In class 2 mode, headset 4 has a +4 dBm transmit power and −82 dBm receive sensitivity, resulting in a range of about 10 meters. Thus, in this example, link availability boundary 908 is approximately 10 meters, beyond which the headset 4 is unable to form a wireless link 702 with PC 10 and is therefore in a no-link state 710.

System 700 utilizes RSSI values and the link status of link 702 to determine whether headset 4 is in a NEAR state, FAR state, or no-link state using methods described herein. In one example, responsive to this NEAR/FAR/No-Link determination, PC 10 provides user 2 with an option to initiate a reconnect call using PC 10 to initiate the call over a landline. In one example, a reconnect call option is presented if a link is determined. In a further example, a reconnect call option is presented only if a NEAR status is determined. The call transitioning system may be automatically configured or the user may select that the call transitioning operate based on NEAR/FAR status, link status, or both NEAR/FAR and link status. In further examples, other methods and apparatuses for determining proximity between devices may be utilized. For example, radio frequency identification (RFID), infrared (IR), or GPS units may be used.

Figure 8:
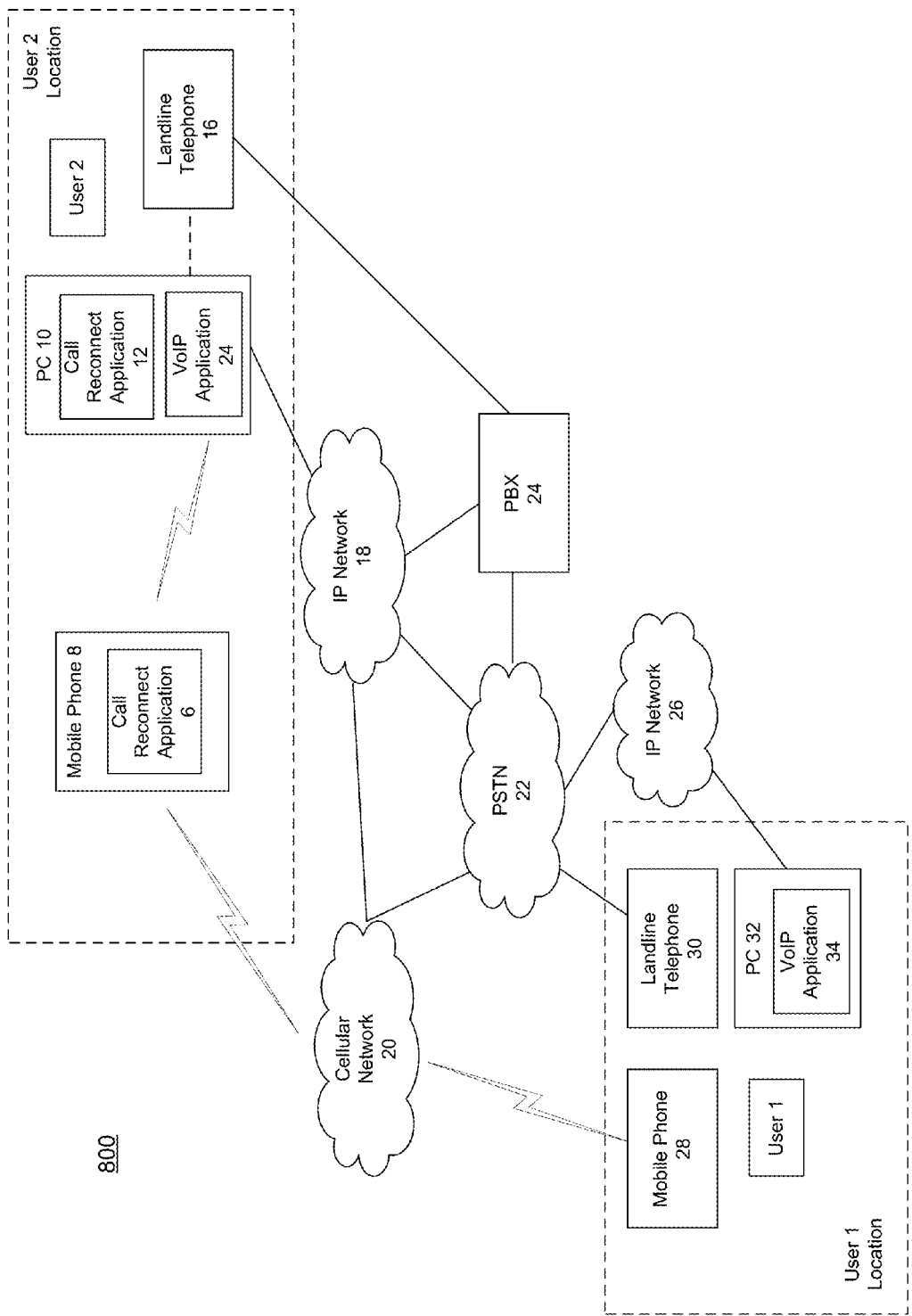
FIG. 8 illustrates a system for transitioning a call in a further example.

FIG. 8 illustrates a system 800 for transitioning a call in a further example. System 800 operates in a similar manner to system 100 described above in reference to FIG. 1, with the exception that call reconnect application 6 resides on and operates on mobile phone 8. Call reconnect application 6 is configured to operate as described above in reference to FIG. 1.

Figure 9:
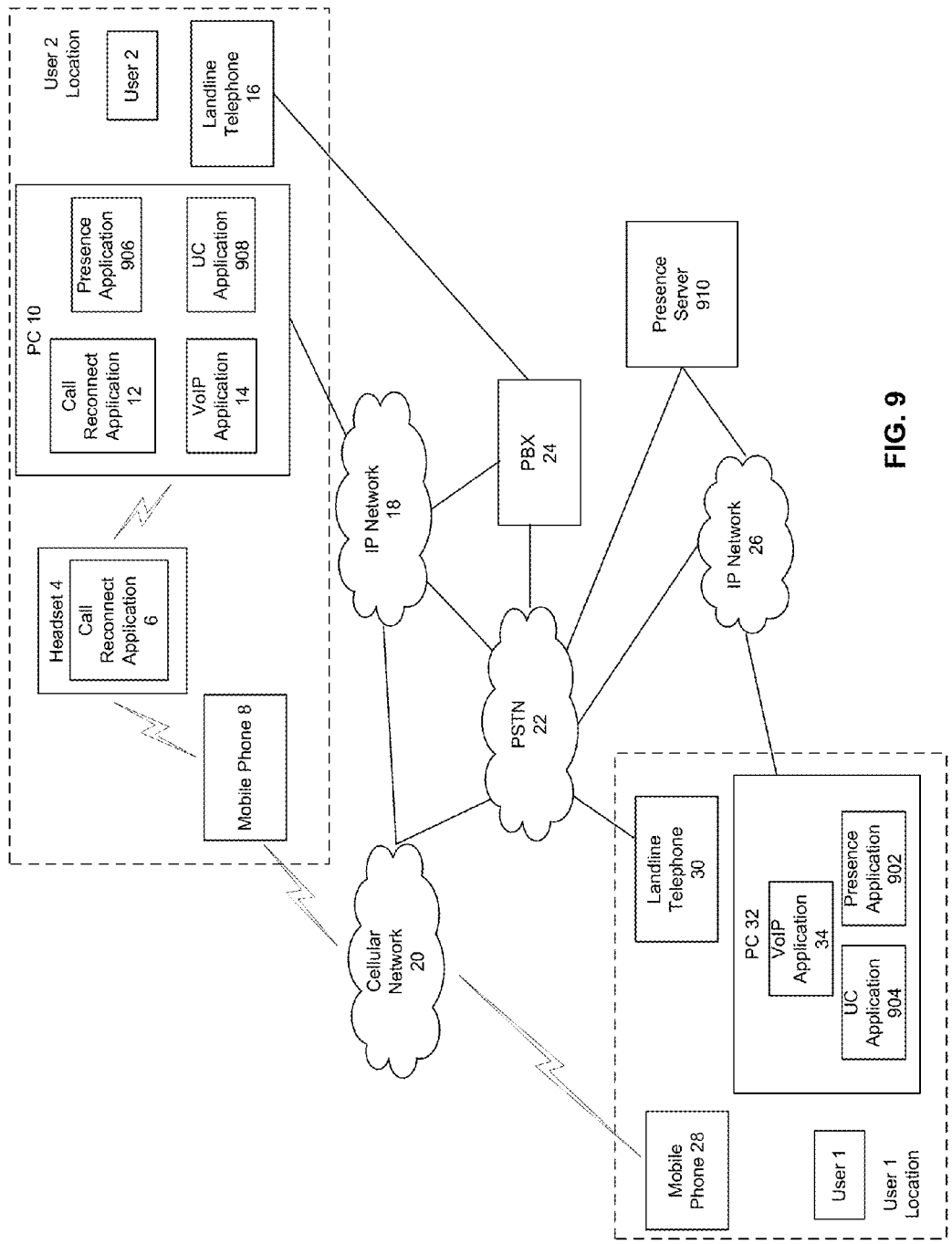
FIG. 9 illustrates a system for reporting call participant presence data in one example.

FIG. 9 illustrates an example configuration for gathering and reporting call participant presence information utilized as described herein. PC 32 transmits and receives presence information to and from a unified communications (UC) presence server 910 in a client-server relationship. In the example shown in FIG. 9, presence data is transmitted between PC 32 and UC presence server 910 via IP network 26, and between PC 10 and UC presence server 910.

In one example, PC 32 includes a presence application 902 interfacing with a client-side UC application 904 having exposed client-side interfaces for reporting presence information from the presence application 902 to the unified communications presence server 910 via the UC application 904. PC 10 includes a presence application 906 and a UC application 908 configured and operable in a similar manner as presence application 902 and UC application 904.

UC application 904 accepts presence state changes from presence application 902, and reports the presence state to UC presence server 910. As described herein, such presence change state changes may include whether user 1 (e.g., a user 1 mobile phone 28 or a user 1 headset) is in proximity to PC 32 and whether user 2 (e.g., a user 2 headset 4 or mobile phone 8) is in proximity to PC 10. In one example, presence data is determined as described above with respect to FIG. 7.

In further example, presence application 902 and client-side UC application 904 may be integrated into a single presence application. Client-side UC application 904 transmits and receives presence data to and from UC presence server 910, providing an interface to alter the presence state of the user.

Client-side UC application 904 may, for example, be a commercial presence UC application such as IBM Lotus Sametime 8.0, Microsoft Office Communicator running in conjunction with Office Communications Services 2007, or other similar UC application. UC presence server 910 may, for example, be an IBM Lotus Sametime Server where the client-side UC application 904 is also IBM Lotus Sametime.

In a further example configuration, UC application 904 does not expose client-side interfaces and presence application 902 cannot alter the user's presence state. The UC application 28 will only accept presence state changes from the UC presence server 910. Presence application 902 interfaces with a server-side presence application running on a presence server (not shown), which in turn communicates with a UC server-side application running on UC presence server 910. The presence application 902 reports presence information such as the user presence state to the presence server, which in turn reports the presence information to UC presence server 910.

Figure 10:
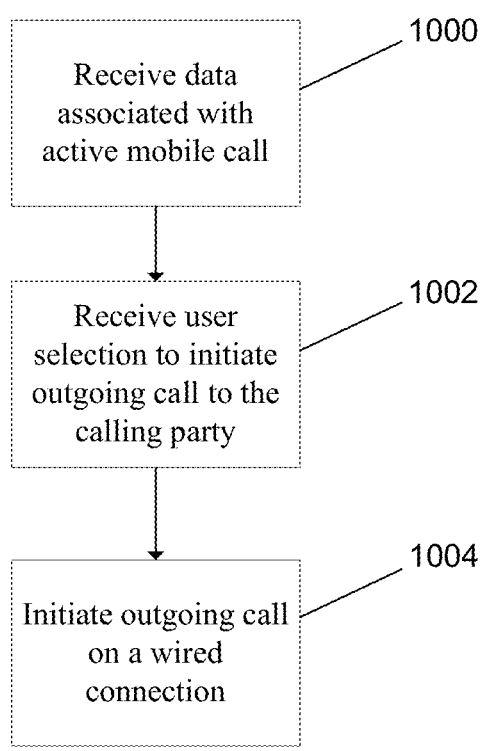
FIG. 10 is a flow diagram illustrating a method for call initiation in one example.

FIG. 10 is a flow diagram illustrating a method for call initiation in one example. At block 1000, data associated with an active wireless mobile phone call is received. For example, the data includes caller identification data corresponding to a calling party.

In one example, the active wireless mobile phone call is between a user and the calling party over a cellular communications network and the wired connection is between a computer and an IP network. In one example, the active wireless mobile phone call is between a calling party mobile phone and a user mobile phone and the outgoing call is made to a calling party telephony device operating on a wired connection.

In one example, the data received includes a calling party presence data associated with the calling party or a user presence data associated with the user. For example, the calling party presence data includes a calling party location information. The calling party location information may include a calling party proximity to a telephony capable device operating on a wired connection. The calling party location information may be processed to determine when to present to the user an option to initiate an outgoing call to the calling party. For example, the user presence data includes user location information including user proximity to a telephony device operable to initiate the outgoing call over the wired connection. In one example, the data associated with an active wireless mobile phone call further includes a user identity.

In one example, the method further includes detecting a mobile device in communication range, the mobile device in use with the active wireless mobile phone call. For example, the mobile device is a wireless headset or mobile phone. Detecting a mobile device in communication may include detecting a transition from an out of range status to an in range status.

At block 1002, a user selection is received to initiate an outgoing call to the calling party. In one example, the user selection to initiate the outgoing call to the calling party is received at a user mobile phone, a telephony capable device operable to initiate the outgoing call over the wired connection, or a headset. In one example, the user selection to initiate an outgoing call to the calling party is a single action responsive to a displayed option to reconnect the active wireless mobile call.

At block 1004, the outgoing call is initiated over a wired connection. In one example, the outgoing call is a VoIP call or a PSTN call. In one example, the outgoing call is initiated by a personal computer in close proximity to a mobile phone associated with the active wireless mobile phone call. In one example, the outgoing call is a video conferencing call or a web conferencing call. In one example, the method further includes initiating termination of the active wireless mobile phone call.

Figure 11:
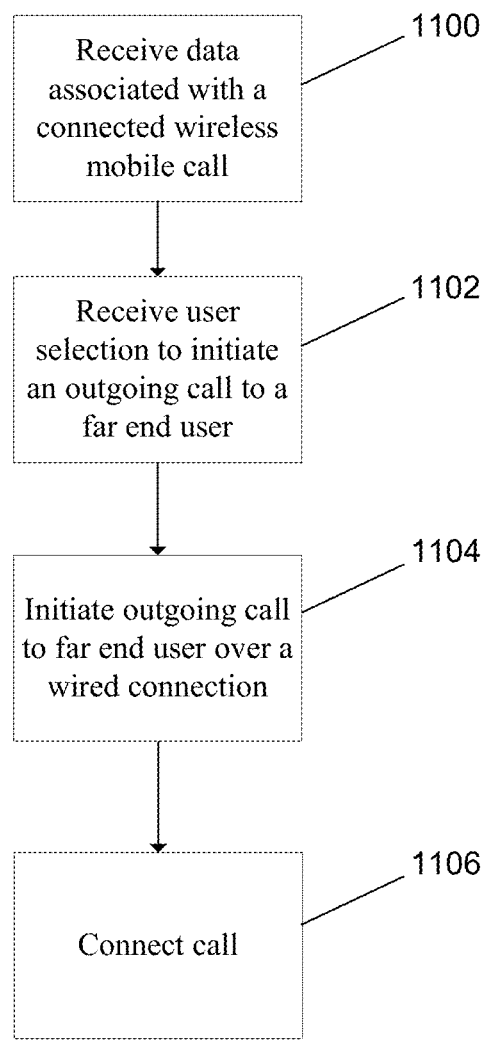
FIG. 11 is a flow diagram illustrating a method for call initiation in a further example.

FIG. 11 is a flow diagram illustrating a method for call initiation in a further example. At block 1100, data associated with a connected wireless mobile phone call is received.

For example, the data includes identification data of a local mobile phone user and a far end user. In one example, the local mobile phone user initiated the connected wireless mobile phone call. In a further example, the far end user initiated the connected wireless mobile phone call. In one example, the connected wireless mobile phone call is between the local mobile phone user and the far end user over a cellular communications network and the wired connection is between a computer and an IP network. In one example, the method further includes detecting a mobile device in communication range, the mobile device in use with the connected wireless mobile phone call. In one example, the data received includes a far end user presence data associated with the far end user or a local mobile phone user presence data associated with the local mobile phone user.

At block 1104, a user selection is received to initiate an outgoing call to the far end user. In one example, the user selection to initiate the outgoing call to the far end user is received at a mobile phone, a telephony capable device operable to initiate the outgoing call over the wired connection, or a headset.

At block 1106, the outgoing call is initiated over a wired connection to the far end user. In one example, the outgoing call is a VoIP call or a PSTN call. In one example, the outgoing call is initiated by a personal computer in close proximity to a mobile phone associated with the connected wireless mobile phone call.

Figure 12:
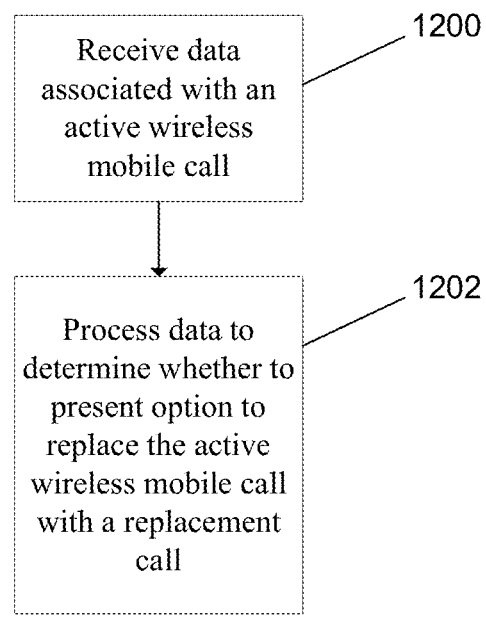
FIG. 12 is a flow diagram illustrating a method for call initiation in a further example.

FIG. 12 is a flow diagram illustrating a method for call initiation in a further example. At block 1200, data associated with an active wireless mobile phone call is received. In one example, the data includes caller presence information corresponding to a calling party.

At block 1202, the data is processed to determine whether to present an option to a user to replace the active wireless mobile phone call with a replacement call. In one example, processing the data includes determining whether a calling party is in proximity to a telephony device operable over a wired connection. In one example, processing the data includes determining whether the user is in proximity to a telephony device operable over a wired connection.

The various examples described above are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. Such changes may include, but are not necessarily limited to: protocols used to establish the wireless communication links between the headset and PC and mobile phone; standards to perform the VoIP call setup, signaling, and control; user interface input mechanisms to control call transition or hookswitch operation at the headset. For example, the communications networks used may be a PSTN, a public or private data network, wireline or wireless network, cellular network, or the Internet. Furthermore, the functionality associated with any blocks described above may be centralized or distributed. It is also understood that one or more blocks of the headset may be performed by hardware, firmware or software, or some combinations thereof. Such modifications and changes do not depart from the true spirit and scope of the present invention that is set forth in the following claims.

Those skilled in the art will appreciate that the reference to the terms "VoIP" and "VoIP telephone" are used in the generic sense to include any "voice-over-packet" technique or device, without limitation to a specific standard.

While the exemplary embodiments of the present invention are described and illustrated herein, it will be appreciated that they are merely illustrative and that modifications can be made to these embodiments without departing from the spirit and scope of the invention. Thus, the scope of the invention is intended to be defined only in terms of the following claims as may be amended, with each claim being expressly incorporated into this Description of Specific Embodiments as an embodiment of the invention.

What is claimed is:

1. A headset device, comprising:
    a hardware controller;
    a wireless transceiver;
    a user interface; and
    a memory coupled to the hardware controller, the memory having stored therein instructions which, when executed by the hardware controller, cause the hardware controller to:
        receive, using the wireless transceiver, call data from a mobile phone, the call data including caller identification data that identifies a calling party of an active phone call at the mobile phone,
        store the call data,
        receive, from the mobile phone, a first wireless signal including inbound audio of the active phone call,
        transmit, to the mobile phone, a second wireless signal including outbound audio of the active phone call,
        during the active phone call, form a local wireless link with a computing device,
        during the active phone call, and after forming the local wireless link with the computing device, receive a key input from a user via the user interface, and
        in response to receiving the key input from the user, transmit, over the local wireless link to a call reconnect application of the computing device, an indication of the active phone call and the call data.

2. The headset device of claim 1, wherein the memory stores a call reconnect application executable by the hardware controller.

3. The headset device of claim 1, wherein the user interface includes at least one of a visual interface, a tactile interface, and an audio interface operable to receive the key input from the user.

4. The headset device of claim 1, the instructions, when executed by the hardware controller, further causing the hardware controller to:
    after transmitting the indication of the active phone call and the call data to the computing device:
        receive, from the computing device and over the local wireless link, a third wireless signal including second inbound audio of a second active phone call with the calling party, and
        transmit, to the computing device and over the local wireless link, a fourth wireless signal including second outbound audio of the second active phone call with the calling party.

5. The headset device of claim 1, wherein the wireless transceiver includes a Bluetooth transceiver.

6. The headset device of claim 5, wherein the Bluetooth transceiver is operable to simultaneously form Bluetooth ACL and SCO links with the mobile phone and the computing device.

7. The headset device of claim 1, wherein the local wireless link includes a Bluetooth link.

8. The headset device of claim 1, wherein the caller identification data includes a phone number of the calling party.

9. The headset device of claim 1, wherein the caller identification data includes a name of the calling party.

10. A method, comprising:
    receiving, at a headset and from a mobile phone, call data using a wireless transceiver, the call data including caller identification data that identifies a calling party of an active phone call at the mobile phone;
    storing the call data to a memory;
    receiving, from the mobile phone, a first wireless signal including inbound audio of the active phone call;
    transmitting, to the mobile phone, a second wireless signal including outbound audio of the active phone call;
    during the active phone call, forming a local wireless link with a computing device;
    during the active phone call, and after forming the local wireless link with the computing device, receiving a key input from a user; and
    in response to receiving the key input from the user, transmitting, over the local wireless link to a call reconnect application of the computing device, an indication of the active phone call and the call data.

11. The method of claim 10, further comprising, after transmitting the indication of the active phone call and the call data to the computing device:
    receiving, from the computing device and over the local wireless link, a third wireless signal including second inbound audio of a second active phone call with the calling party; and
    transmitting, to the computing device and over the local wireless link, a fourth wireless signal including second outbound audio of the second active phone call with the calling party.

12. The method of claim 10, wherein the caller identification data includes a phone number of the calling party.

13. The method of claim 10, wherein the caller identification data includes a name of the calling party.

14. The method of claim 10, wherein the local wireless link includes a Bluetooth link.

15. A computer readable storage memory storing instructions that when executed by a hardware controller cause the hardware controller to perform a method for call initiation comprising:

receiving, at a headset and from a mobile phone, call data using a wireless transceiver, the call data including caller identification data that identifies a calling party of an active phone call at the mobile phone;

storing the call data to a memory;

receiving, from the mobile phone, a first wireless signal including inbound audio of the active phone call;

transmitting, to the mobile phone, a second wireless signal including outbound audio of the active phone call;

during the active phone call, forming a local wireless link with a computing device;

during the active phone call, and after forming the local wireless link with the computing device, receiving a key input from a user; and in response to receiving the key input from the user, transmitting, over the local wireless link to a call reconnect application of the computing device, an indication of the active phone call and the call data.

16. The computer readable storage memory of claim 15, wherein the method for call initiation further comprises:

receiving, from the computing device and over the local wireless link, a third wireless signal including second inbound audio of a second active phone call with the calling party; and transmitting, to the computing device and over the local wireless link, a fourth wireless signal including second outbound audio of the second active phone call with the calling party.

17. The computer readable storage memory of claim 15, wherein the caller identification data includes a phone number of the calling party.

18. The computer readable storage memory of claim 15, wherein the caller identification data includes a name of the calling party.

19. The computer readable storage memory of claim 15, wherein the local wireless link includes a Bluetooth link.

* * * * *